United States Patent [19]
van der Tol

[11] Patent Number: 5,539,845
[45] Date of Patent: Jul. 23, 1996

[54] INTEGRATED OPTICAL POLARIZATION CONVERTER WITH ENHANCED PERIODIC COUPLING AND METHOD OF FABRICATING SAME

[75] Inventor: Johannes J. G. M. van der Tol, MP Zoetermeer, Netherlands

[73] Assignee: Koninklijke PTT Nederland N.V., Groningen, Netherlands

[21] Appl. No.: 485,653

[22] Filed: Jun. 7, 1995

Related U.S. Application Data

[63] Continuation of Ser. No. 306,123, Sep. 14, 1994, abandoned.

[30] Foreign Application Priority Data

Sep. 24, 1993 [NL] Netherlands ............................ 9301656

[51] Int. Cl.$^6$ ................................ G02B 6/10; H01L 21/70
[52] U.S. Cl. ................................ 385/11; 385/14; 385/27; 385/28; 385/31; 385/131; 385/132; 359/192; 359/195; 437/51; 437/225
[58] Field of Search ................................ 385/1, 2, 3, 10, 385/11, 14, 27, 28, 31, 37, 45, 129, 130, 131, 132; 359/192, 195; 437/51, 147, 225, 228, 229, 24 L

[56] References Cited

U.S. PATENT DOCUMENTS

| | | | |
|---|---|---|---|
| 3,614,198 | 10/1971 | Martin et al. | 385/129 X |
| 3,884,549 | 5/1975 | Wang et al. | 385/129 X |
| 4,359,260 | 11/1982 | Reinhart et al. | 385/28 X |
| 4,773,721 | 9/1988 | Erman et al. | 385/131 X |
| 4,775,206 | 10/1988 | Erman et al. | 385/131 X |
| 4,859,013 | 8/1989 | Schmitt et al. | 385/130 X |
| 4,867,510 | 9/1989 | Dobson | 385/130 X |
| 4,974,931 | 12/1990 | Poole | 385/28 |
| 4,983,005 | 1/1991 | Gamonal | 385/14 |
| 5,078,512 | 1/1992 | Ando | 385/11 |
| 5,078,516 | 1/1992 | Kapon et al. | 385/129 |
| 5,150,251 | 9/1992 | Tomita et al. | 385/11 |
| 5,185,828 | 2/1993 | van der Tol | 385/28 |

FOREIGN PATENT DOCUMENTS

| | | | |
|---|---|---|---|
| 0513919A1 | 11/1992 | European Pat. Off. | 385/28 X |
| 0285066B1 | 9/1992 | France | 385/28 X |
| WO93/15423 | 8/1993 | WIPO | 385/28 X |

OTHER PUBLICATIONS

A. Pohl et al; "Fabrication & Measurement of Fiber-Matched InP Rib Waveguides"; Jan./Feb. 1993; pp. 12–16; Frequenz.
Y. Shani et al; "Polarization Rotation in Asymmetric Periodic Loaded Rib Waveguides"; Sep. 9, 1991; pp. 1278–1280; Appl. Phys. Lett.; vol. 59, No. 11.
H. Heidrich et al; "Passive Mode Converter with a Periodically Tilted InP/GaInAsP Rib Waveguide"; Jan. 1992; pp. 34–36; IEEE Photonics Technology Letters, vol. 4, No. 1.
H. G. Unger; "Planar Guides With Transverse Confinement"; 1977; pp. 196–226; Planar Optical Waveguides and Fibres; Clarendon Press, Oxford, England (no month of publication).
N. Mabaya et al; "Finite Element Analysis of Optical Waveguides" Jun. 1981; pp. 600–605; IEEE Transactions on Microwave Theory and Techniques, vol. MTT–29, No. 6.

(List continued on next page.)

*Primary Examiner*—Brian Healy
*Attorney, Agent, or Firm*—Frishauf, Holtz, Goodman, Langer & Chick

[57] ABSTRACT

Integrated optical polarization converter provided with a channel-type waveguide (B) defined by a strip-type structure ($S_4$) supported by a substrate (S) and having a periodic concatenation of two different part strips having side walls which are at different angles with the plane of the substrate. The two part strips have as cross-sections either a trapezium (EFGH with $\Delta_1, \Delta_2 \neq 0$) and a rectangle (EFGH with $\Delta_1 = \Delta_2 = 0$), or both of them a right-angled trapezium with oblique sides situated opposite one another (EFGH with $\Delta_1 0$ and $\Delta_2 \neq 0$, and EFGH with $\Delta_1 \neq 0$ and $\Delta_2 = 0$). Oblique and vertical side walls on such a strip-type structure supported by a substrate are fabricated, in the case of suitable crystal orientation, by means of two mutually complementary mask patterns, using etching steps, employing wet-chemical and dry etchants respectively.

13 Claims, 8 Drawing Sheets

OTHER PUBLICATIONS

S. M. Sze; "Semiconductor Devices–Physics & Technology"; 1985; no month of pub. pp. 438–443; AT&T Bell Laboratories, Murray Hill, New Jersey.

P. Liu; "LiNbO$_3$ Waveguide Modulator with 1.2 µm Thick Electrodes Fabricated by Lift–Off Technique"; Oct. 1982; pp. 1780–1782; IEEE Journal of Quantum Electronics, vol. QE–18, No. 10.

U. Niggebruggs et al; "A Novel Process for Reactive Ion Etching on InP, Using CH$_4$/H$_2$"; 1985; pp. 367–372; Gallium Arsenide and Related Compounds 1985 (no month of publication).

INTEGRATED OPTICAL POLARIZATION CONVERTER WITH ENHANCED PERIODIC COUPLING AND METHOD OF FABRICATING SAME

This application is a continuation of application Ser. No. 08/306,123, filed Sep. 14, 1994, now abandoned.

BACKGROUND OF THE INVENTION

The invention is in the field of the conversion of guided modes of light waves in integrated optical devices. More in particular, the invention relates to a polarization converter for the conversion of a fraction of a signal component, propagating according to a first guided mode, of an optical signal into a signal component propagating according to a second guided mode, the first and second modes relating to different polarization modes, comprising a channel-type waveguide supported by a substrate, in which waveguide a periodic coupling takes place between the said guided modes of the optical signal propagating in the waveguide, said waveguide comprising an incoming wave-guiding section, an intermediary wave-guiding section and an output wave-guiding section, the intermediary wave-guiding section having a periodic geometrical structure including a periodic concatenation of, within a period length, two wave-guiding subsections, the lengths of the subsections and the number of periods being tailored to the desired conversion fraction.

The invention further relates to a method for fabricating a channel-type waveguide which is supported by a substrate and comprises a concatenation of wave-guiding sections having alternately a first and a second mutually different waveguide profile, each defined by a strip-type structure, which channel-type waveguide can be used as an intermediary waveguide in a passive polarization converter of the abovementioned type.

Reference [1] (see under References) discloses such passive converters, not only for conversions between guided modes having different polarizations, but also between guided modes having the same polarization. The conversion effect is based on symmetry of the coupling planes between the different successive wave-guiding sections, which are situated, by a suitable choice of the lengths of the subsections, at such mutual distances that positive interference is possible between the subfractions, converted in each coupling plane, of a specific guided mode. For an integrated version of such a mode converter, the symmetry required of the coupling planes is accomplished, for example, by differences in width of the different successive sections, or by successive sections having identical profiles being joined to one another in an offset manner. Although such discontinuities in a lateral direction are relatively easy to fabricate, an example provided of a polarization converter (see Example 1, page 7, lines 37–53) shows that the conversion efficiencies in the coupling planes are rather low. Consequently, in such a comparator, converting a desired fraction requires a relatively large number of coupling planes, and as a result the length of such a component is relatively large.

Further, waveguide structures are known which are provided with periodic discontinuities in waveguide profile in a vertical direction, i.e. perpendicular to the plane of the substrate, as for example from references [2] and [3]. Thus reference [2] discloses a polarization rotation mechanism on the basis of a periodic perturbation in a ridge-type waveguide by means of an asymmetric periodic coverage, disposed in the longitudinal direction on the ridge of the guide, with roof-shaped elements which per subsection are alternately located on the left-hand side and the right-hand side of the ridge. Reference [3] describes a passive polarization converter based on a periodic waveguide structure obtained by applying, over a periodically interrupted edge or a stepped recess etched into the substrate, in the longitudinal direction, the layer structure for a ridge-type waveguide. As a result, the wave-guiding subsections underneath which such an edge is situated, have a somewhat tilted waveguide profile with respect to the waveguide profile of the subsections situated in-between without such an edge. Although much higher coupling factors are obtained by using such periodic discontinuities in waveguide profile in a vertical direction, the losses as a result of attenuation are likewise much greater. Moreover, the fabrication of the periodic waveguide structures known from the references [2] and [3] is rather laborious.

SUMMARY OF THE INVENTION

The object of the invention is to provide a polarization converter of the abovementioned type having a considerably increased conversion efficiency per coupling plane. To this end, the polarization converter is, according to the invention, characterized in that the two wave-guiding subsections have different waveguide profiles mainly determined by strip-type elements provided with side walls which are at mutually different angles with respect to the plane of the substrate. The invention is based on the following insight. In a planar waveguide, a guided signal has two polarization modes, the TE mode and the TM mode. The electromagnetic field of the TE mode has a transverse E component and two H components, viz. a normal and a longitudinal one. The field of the TM mode, in contrast, has a transverse H component and two E components, viz. a normal and a longitudinal one. In a channel-type waveguide, i.e. having a lateral confinement, the fields of the TE mode and of the TM mode do indeed both contain all three E components and all three H components, but the fields of the two polarizations are dominated by those components which are present in the signal guided in a planar waveguide. Conversions between guided modes having different polarizations therefore must make use of the coupling between a dominant field component of the one mode and a very weak field component in the other mode, which in the known converters results in relatively low conversion efficiencies. It has been found that the weak field components can be enhanced with respect to the dominant by letting the lateral confinement of a channel-type guide no longer be defined exclusively by vertical side faces of the structure which defines the guide, but by causing at least one of the side faces or side walls to form an acute angle with the plane of the substrate on which or in which the guide is implemented. It should be noted in this context that hereinafter the terms side wall and side face are used synonymously.

In a preferred embodiment, the polarization converter is further characterized in that the strip-type elements of the two subsections, seen transversely to their longitudinal direction, have mutually different trapeziform cross-sections.

It is known, for example from references [5] and [6], that by means of wet-chemical etching of a substrate made of crystalline material, given a suitable orientation, ridge-type patterns having oblique side faces can be achieved. In the case of dry-etching of such a crystalline material, however, ridge-type patterns having, in the main, vertical side faces are produced.

A method for fabricating a channel-type waveguide on a substrate made of crystalline material, which waveguide comprises a concatenation of wave-guiding sections having alternately a first and a second mutually different waveguide profile, defined by strip-type elements having different, in the main trapeziform cross-sections, which channel-type guide can be used as an intermediary waveguide in a polarization converter of the above-mentioned type, is, according to the invention, characterized in that the method comprises the following steps:

(a)—applying to the substrate a first strip-type mask pattern of a first mask material in a direction tailored to the crystal orientation of the light-guiding layer, (b)—applying to the substrate, and partially over the first mask pattern, a second mask pattern of a second mask material, which second mask material comprises a number of parallel strip-type subpatterns which in the main lie transversely to, and at least partially over, the strip-type first mask pattern, (c)—a first etching step, using first etchants, of the parts of the substrate which are not covered by the first and second mask materials, (d)—removing the second mask material, (e)—covering the parts etched in the first etching step with a third mask material, (f)—a second etching step, using second etchants, of parts of the substrate which are not covered by the first and third mask materials, (g)—removing the first and third mask materials, one of the two etching steps being carried out with wet-chemical etchants and the other etching step being carried out with dry etchants.

For the purpose of implementing the alternation of vertical and oblique side walls on the strip-type structures, two mask patterns used in the method can be chosen in a complementary manner. This has the advantage that, for the purpose of successively removing the second mask pattern and applying the third mask pattern, a technique can be used which is known as "lift-off" technique (see for example reference [8a]), by means of which special alignment of the two mask patterns with respect to one another can be dispensed with. To this end, the method according to the invention preferably is characterized in that the step (c) is carried out using wet-chemical etchants, and in that the steps (d) and (e) are carried out using a "lift-off" technique which comprises the following substeps:

(de1)—covering the first and second mask patterns and the etched sections of the substrate with a mask layer of a material identical to the first mask material, and (de2)—removing, using a suitable solvent, the second mask material, including those parts of the first mask material which are situated thereon.

References

[1] EP-A-0513919;

[2] Y. Shani et al.: "Polarization rotation in asymmetric periodic loaded rib waveguides", Applied Physics Letters, Vol. 59, No. 11, 9 September 1991, pp. 1278–1280;

[3] H. Heidrich et al.: "Passive mode converter with a periodically tilted InP/GaInAsP rib waveguide", IEEE Photonics Technology Letters, vol. 4, no. 1, January 1992, pp. 34–36;

[4] H.-G. Unger, 'Planar optical waveguides and fibres', Clarendon Press, Oxford 1980, cpt 3 'Planar guides with transverse confinement', and more particularly sections 3.2, 3.3 and 3.4;

[5] P. H. L. Notten et al.: "Etching of III–V semiconductors, an electrochemical approach", Elseviers Advanced Technology, 1991, cpt 8: "Profile etching", pp. 237–242;

[6] EP-A-0285066;

[7] N. Mabaya et at.: "Finite element analysis of optical waveguides", IEEE Trans. Microwave Theory Tech., vol. MTT-29, No. 6, June 1981, pp. 600–605;

[8a] S. M. Sze: "Semiconductor devices, physics and technology", John Wiley & Sons, 1985, cpt. 11; "Optical lithography:", section 11.1.5 "Pattern Transfer", pp. 439–442, more part. FIG. 11;

[8b] P.-L. Liu: "LiNbO$_3$ waveguide modulator with 1.2 [m thick electrodes fabricated by lift-off technique", IEEE J. Quantum Electronics, Vol. QE-18, No. 10, Oct. 1982, pp. 1780–1782;

[9] U. Niggebrugge and G. Garus: "A novel process for reactive ion etching on InP, using CH$_4$/H$_2$", Inst. Phys. Conf. Set. No. 79: Chapter 6, Gallium Arsenide and Related Compounds 1985, pp. 367–372.

BRIEF DESCRIPTION OF THE DRAWINGS

The invention will be explained in more detail by means of the description of a number of illustrative embodiments, reference being made to the drawings in which.

DETAILED DESCRIPTION

Figure 1:
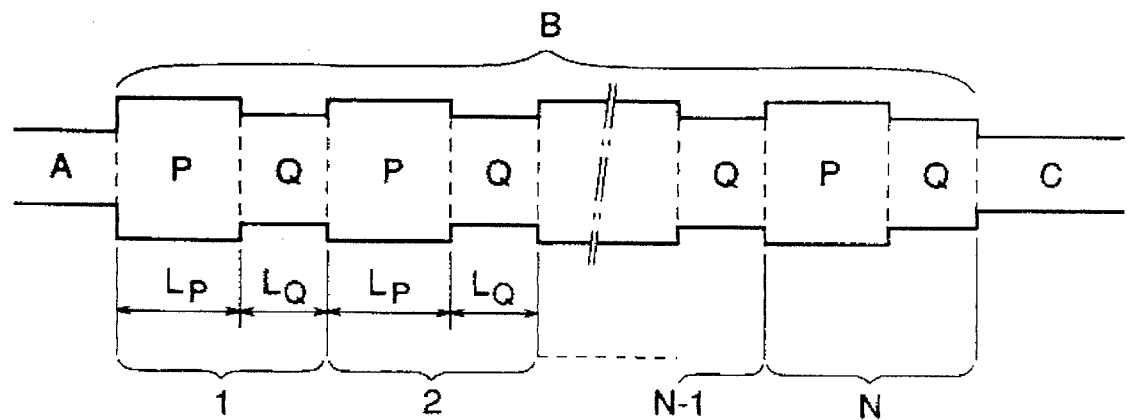
FIG. 1: shows, in a top view, a diagrammatic representation of a polarization converter having a general structure, known per se, of a passive mode converter.

In a planar waveguide, a guided signal has two polarization modes, the TE mode and the TM mode. The electromagnetic field of the TE mode has a transverse E component and two H components, viz. a normal and a longitudinal one. The field of the TM mode, in contrast, has a transverse H component and two E components, viz. a normal and a longitudinal one. In a channel-type waveguide, i.e. having a lateral confinement, the fields of the TE mode and of the TM mode do indeed both contain all three E components and all three H components, but the fields of the two polarizations are dominated by those components which are present in a signal guided in a planar waveguide. Polarization converters which are based on periodic conversions between guided modes having different polarizations, at coupling planes periodically present in a channel-type waveguide, must therefore make use of the coupling between a dominant field component of the one mode and a very weak field component in the other mode. For passive polarization converters, as known from reference [1], this results in a low coupling factor and a high attenuation per coupling plane and therefore in relatively low conversion efficiencies per coupling plane. As a result, a large number of coupling planes is needed to obtain the conversion fraction desired for a given attenuation requirement, as is a correspondingly large length for the channel-type guide in which the periodic coupling takes place.

It was found, however that the weak field components can be enhanced with respect to the dominant one by having the lateral confinement of a channel-type guide no longer exclusively defined by vertical side faces of the structure which defines the guide, but by causing at least one of the side faces to form an acute angle with the plane of the substrate on which or in which the guide is implemented. This means that if, in a passive polarization converter whose intermediary waveguide is defined by a periodic concatenation of two strip-type elements having a different cross-section, instead of two strip-type elements having, in the main, vertical side walls, i.e. having different rectangular cross-sections, strip-type elements are used of which at least one of the two strip-type elements has a side face which is not perpendicular to the plane of the substrate, coupling planes can be obtained which have an increased coupling factor per coupling plane.

The use thereof in such polarization converters therefore leads to polarization converters having higher conversion efficiencies, which consequently are shorter in length with a lower signal attenuation. Oblique side faces on strip- or ridge-type patterns can be achieved by means of a substrate made of crystalline material, or a layer of crystalline material situated on a substrate, given a suitable orientation, being etched wet-chemically according to an etching regime which is kinetic, i.e. the diffusion of the etched material in the etching fluid is more rapid than the production thereof.

By means of dry-etching of such a crystalline material, in contrast, in the main vertical side faces are obtained. By successive application of both etching methods, while masking such materials in a suitable manner, waveguide sections can therefore be fabricated which are defined by strip-type elements having a trapeziform cross-section, and more in particular strip-type elements having a cross-sectional shape which is an isosceles trapezium, a right-angled trapezium or a rectangle. The various mode conversions require periodic repetition of two waveguide sections having different waveguide profiles, which are either both symmetric or both asymmetric or alternately symmetric and asymmetric. For the purpose of alternate succession of two symmetric strip-type elements, such as are required for $TE_{00}$-$TM_{01}$ and $TE_{01}$-$TM_{00}$ conversions, only the elements having a rectangle and an isosceles trapezium as a cross-section are suitable. For other conversions between the polarizations TE and TM, such as $TE_{00}$-$TM_{00}$ and $TE_{01}$-$TM_{01}$, at least one of the two waveguide profiles is asymmetric, for which purpose, therefore, a strip-type element having a right-angled trapezium as a cross-section is suitable.

Hereinafter, the general construction, known per se, of a passive polarization converter will be outlined briefly. Then, the geometrical structures of the waveguide sections for polarization converters according to the invention are described and illustrated by a few examples on the basis of two substrate materials customary in integrated optics, viz. indium phosphide (InP) and silicon dioxide ($SiO_2$). Finally, a method is described for the fabrication of preferred embodiments of channel-type waveguides suitable for use as intermediary waveguides for a passive polarization converter, using as an example an implementation on the basis of indium phosphide.

FIG. 1 diagrammatically shows, in a top view, a polarization converter according to the general structure of a passive mode converter. As is known from reference [1], this converter is composed of channel-type wave-guiding sections, viz. an input section A, an intermediary section B, and an output section C. The intermediary section B consists of an N-fold repetition of two concatenated wave-guiding subsections P and Q having different waveguide profiles. Let the subsections P and Q have mode-dependent propagation constants $\beta_{Pm}$ and $\beta_{Qm}$, respectively, in which the index m can have the values 1 and 2, where m=1 indicates the mode of which a fraction has to be converted and m=2 the mode in which this conversion results. The lengths $L_p$ and $L_Q$ of the subsections P and Q are determined according to $$L_P = \pi |\beta_{P1} - \beta_{P2}|^{-1} \text{ and } L_Q = \pi |\beta_{Q1} - B_{Q2}|^{-1} \quad (1)$$

and the number of repetitions N is determined according to $$f_{12} = \sin^2(2C_{12} * N) \quad (2)$$

in which:

$f_{12}$=the fraction of the intensity of the mode 1 at the transition from the section A to the first subsection P, which after N couplings at the transition from the Nth subsection Q to the section C has been converted into mode 2;

$C_{12}$=the (amplitude) coupling factor of the modes 1 and 2 at each P-Q and Q-P transitions.

If the mode converter converts a guided mode of the zero-th order into a guided mode of the first order, the wave-guiding section A can be monomodal, while the sections P and Q are bimodal. Preferably there is then disposed, between the section A and the first section P, a taper which forms a gradual transition from monomodal to bimodal, without coupling being able to occur such as that in the transition between the sections P and Q.

Figure 2:
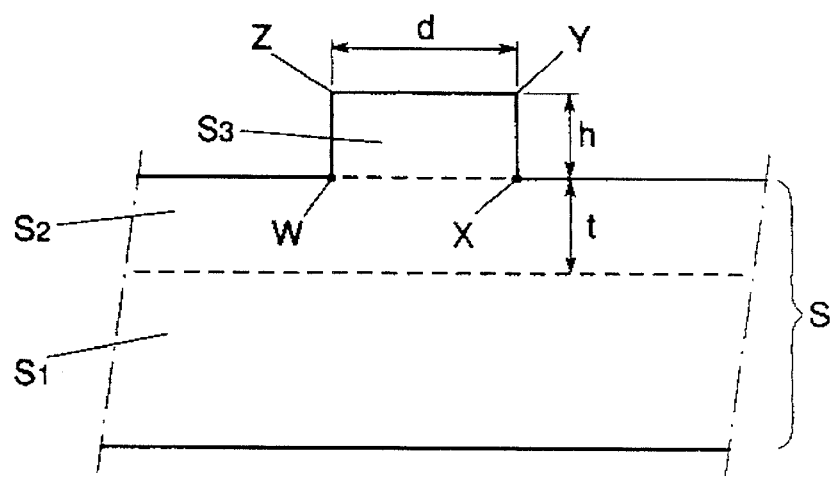
FIG. 2: shows a diagrammatic representation of a known geometrical structure for the wave-guiding subsections P and Q of the polarization converter according to FIG. 1 in a transverse section.

A polarization converter having the structure according to FIG. 1 can be implemented simply in integrated form by means of strip-type elements which define the wave-guiding sections A and C and the subsections P and Q of an intermediary section B, and are disposed on or in a substrate provided with a light-guiding layer. These strip-type elements can be of the "raised strip" or "embedded strip" type, or they can form waveguides of the "rib guide" or "strip loaded guide" type (see, for example, reference [4]). The strip-type elements may, in principle, be of different types, but with a view to production are preferably chosen to be of the same type having the same strip height. FIG. 2 shows a transverse section of a channel-type waveguide of the "raised strip" type, in which the strip-type elements for the subsections P and Q have the conventional rectangular cross-section. On a substrate S, which may be composed of a substrate layer $S_1$ and a light-guiding layer $S_2$ of thickness t, there is situated a strip-type element $S_3$. The strip-type element $S_3$ has a rectangular cross-section WXYZ with height h and width d.

Figure 3:
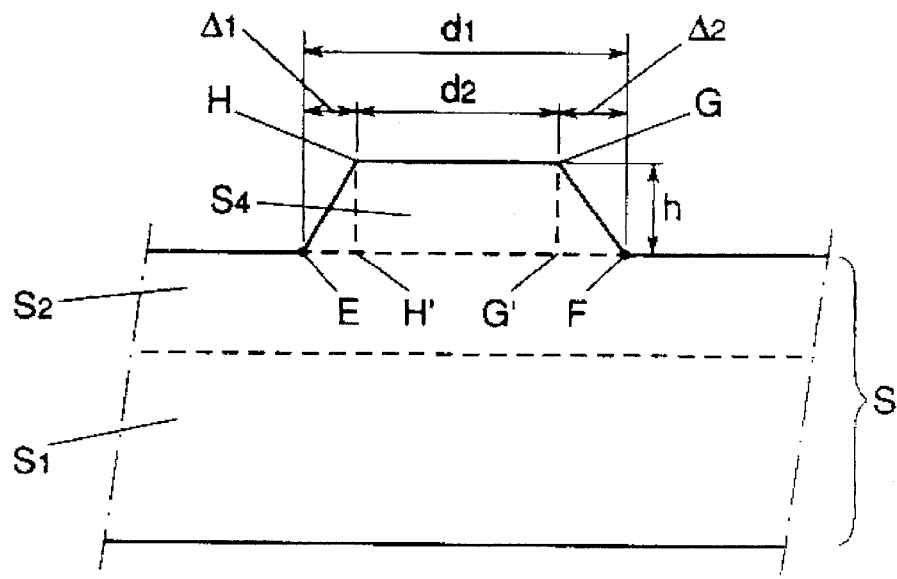
FIG. 3: shows a diagrammatic representation of a geometrical structure according to the invention for the subsections P and Q of the polarization converter according to FIG. 1 in a transverse section.

FIG. 3 shows a transverse section of a channel-type waveguide of the same type as shown in FIG. 2, but now provided with a strip-type element $S_4$ having a trapeziform cross-section EFGH, as used for the subsections P and Q of a polarization converter according to the invention. The cross-section EFGH has a height h, a base side EF of length $d_1$, and a top side GH of length $d_2$, and oblique sides EH and FG having projections EH' and FG' on the base side EF, respectively of lengths $\Delta_1$ and $\Delta_2$. It is therefore the case that: $d_1=d_2+\Delta_1+\Delta_2$.

The trapezium shape is defined by the size of the projections EH' and FG'. For an arbitrary trapezium shape it is the case that: $\Delta_1 \neq \Delta_2 \neq 0$, while for an isosceles trapezium it is the case that: $\Delta_1=\Delta_2 \neq 0$. The trapezium shape is right-angled on the left-hand side, hereinafter sometimes called left-right-angled, if: $\Delta_1=0$. The trapezium shape is right-angled on the right-hand side, hereinafter sometimes called right-right-angled, if: $\Delta_2=0$. The trapezium shape turns into a rectangle when: $\Delta_1=\Delta_2=0$.

The lengths of the projections $\Delta_1$ and $\Delta_2$ may also chosen so as to be negative, such as, for example, in the case of a channel-type waveguide of the "embedded strip" type.

A computation method known under the name "Finite Element Analysis" (see, for example, reference [7]), hereinafter denoted by FEM, was used to calculate a number of examples for various polarization converters based on two different substrate materials, in which subsections having such trapeziform cross-sections are incorporated. The same converters were again calculated, but now with subsections having exclusively rectangular cross-sections. The results thereof, as reproduced hereinafter, in all examples show a considerable increase of the coupling factor per coupling plane, as a result of which, for the same conversion outcomes (i.e. desired conversion fraction and upper limit for the attenuation), a considerably shorter length of the converter is achieved. The calculations were carried out for a light wavelength of 1.5 μm.

EXAMPLE 1 (low-index version)

The material for the substrate S chosen is silicon oxide having a refractive index of 1.444, while the material for the strip-type element $S_4$ of the subsections P and Q is aluminium oxide having a refractive index of 1.673. For $TE_{00}$-$TM_{01}$ and $TE_{01}$-$TM_{00}$ converters, the cross-section of the subsection P is an isosceles trapezium with h=1.0 μm, $d_1$=3.2 μm, $d_2$=1.2 μm, and $\Delta_1=\Delta_2$, and the cross-section of the subsection Q is a rectangle with h=1.0 μm and $d_1=d_2$=2.2 μm. In this arrangement, the two subsections are situated in line in such a way that they have a common plane of symmetry.

FEM results:
$TE_{00} \leftrightarrow TM_{01}$ converter (100% conversion)

| | |
|---|---|
| Attenuation/coupling plane | 0.15 dB |
| Coupling factor/coupling plane ($C_{12}$) | 0.051 rad |
| Number of coupling planes (2N + 1) | 31 |
| Total length (N★($L_P + L_Q$)) | 117 μm |
| Total attenuation | 4.6 dB | and:
$TE_{01} \leftrightarrow TM_{00}$ converter (100% conversion)

| | |
|---|---|
| Attenuation/coupling plane | 0.18 dB |
| Coupling factor/coupling plane | 0.082 rad |
| Number of coupling planes | 19 |
| Total length | 79 μm |
| Total attenuation | 3.4 dB |

Since h=$\Delta_1=\Delta_2$=1.0 μm, the two side walls of the strip-type element of the subsection P form an angle of 45° with the top plane of the substrate S. It is possible, by varying this angle and at the same time keeping constant the sum of the widths $d_1$ and $d_2$, to reduce the total attenuation and the number of coupling planes (therefore the total length) at each other's expense. Thus, in the case of the $TE_{01}$-$TM_{00}$ converter, a total attenuation of 1 dB was found to be achievable at an angle of 77° and 65 coupling planes, which corresponds to a total length of 282 μm.

With the shape of the subsections Q remaining unchanged, but the strip-type element having a trapeziform cross-section in the subsections P being replaced by a strip-type element having a rectangular cross-section with h=1.0 μm and $d_1=d_2$=3.0 μm, the following results were obtained.

FEM results:
$TE_{00} \leftrightarrow TM_{01}$ converter (100% conversion)

| | |
|---|---|
| Attenuation/coupling plane | 0.40 dB |
| Coupling factor/coupling plane ($C_{12}$) | 0.0055 rad |
| Number of coupling planes | 286 |
| Total length | 1100 μm |
| Total attenuation | 114 dB | and:
$TE_{01} \leftrightarrow TM_{00}$ converter (100% conversion)

| | |
|---|---|
| Attenuation/coupling plane | 0.36 dB |
| Coupling factor/coupling plane | 0.0041 rad |
| Number of coupling planes | 385 |
| Total length | 1700 μm |
| Total attenuation | 139 dB |

Here, too, the total attenuation and the number of coupling planes (therefore the total length) can be reduced at each other's expense, in this case by adjusting the width of one of the strip-type elements. Thus, in the case of the $TE_{01}$-$TM_{00}$ converter, a total attenuation of 1 dB was found to be achievable for a width of 2.504 μm (!) of the strip-type element of the subsection P and 53,515 (!) coupling planes, which corresponds to a total length of 23.6 cm (!).

EXAMPLE 2 (high-index version)

This version is based on a standard heterostructure layer stack containing the material InP, for the substrate layer $S_1$ and for the strip-type elements $S_3$ and $S_4$, having a refractive index of 3.1755, and containing the material InGaAsP, for the light-guiding layer $S_2$, having a refractive index of 3.4028. For $TE_{00}$-$TM_{01}$ and $TE_{01}$-$TM_{00}$ converters, the cross-section of the subsection P is an isosceles trapezium with h=0.5 µm, $d_1$=3.0 µm, $d_2$=2.0 µm, and $\Delta_1$=$\Delta_2$, and the cross-section of the subsection Q is a rectangle with h=0.5 µm and $d_1$=$d_2$=2.5 µm. In this arrangement, the two subsections are situated in line in such a way that they have a common plane of symmetry perpendicular to the plane of the substrate.

FEM results:
$TE_{00}$ ↔ $TM_{01}$ converters (100% conversion)

| | |
|---|---|
| Attenuation/coupling plane | 0.039 dB |
| Coupling factor/coupling plane | 0.014 rad |
| Number of coupling planes | 110 |
| Total length | 2500 µm |
| Total attenuation | 4.3 dB | and:
$TE_{01}$ ↔ $TM_{00}$ converters (100% conversion)

| | |
|---|---|
| Attenuation/coupling plane | 0.024 dB |
| Coupling factor/coupling plane | 0.030 rad |
| Number of coupling planes | 51 |
| Total length | 2700 µm |
| Total attenuation | 1.2 dB |

Since h=$\Delta_1$=$\Delta_2$=1.0 µm, the two side walls of the strip-type element of the subsection P form an angle of 45° with the top plane of the substrate S. It is possible, by varying this angle and at the same time keeping the sum of the widths $d_1$ and $d_2$ constant, to reduce the total attenuation and the number of coupling planes at each other's expense. Thus, in the case of the $TE_{01}$-$TM_{00}$ converter, a total attenuation of 1 dB was found to be achievable at an angle of 53° and 60 coupling planes, which corresponds to a total length of 3200 µm.

With the shape of the subsections Q remaining unchanged, but the strip-type element having a trapeziform cross-section in the subsections P being replaced by a strip-type element having a rectangular cross-section with h=0.5 µm and $d_1$=$d_2$=2.9 µm, the following results were obtained.

FEM results:
$TE_{00}$ ↔ $TM_{01}$ converter (100% conversion)

| | |
|---|---|
| Attenuation/coupling plane | 0.073 dB |
| Coupling factor/coupling plane | 0.004 rad |
| Number of coupling planes | 403 |
| Total length | 10,700 µm |
| Total attenuation | 29.3 dB | and:
$TE_{01}$ ↔ $TM_{00}$ converter (100% conversion)

| | |
|---|---|
| Attenuation/coupling plane | 0.042 dB |
| Coupling factor/coupling plane | 0.003 rad |
| Number of coupling planes | 561 |
| Total length | 40,000 µm |
| Total attenuation | 23.4 dB |

Here, too, the total attenuation and the number of coupling planes can be reduced at each other's expense, in this case by adjusting the width of one of the strip-type elements. Thus, in the case of the $TE_{01}$-$TM_{00}$ converter, a total attenuation of 1 dB was found to be achievable for a width of 2.883 µm of the strip-type element of the subsection Q and 13,127 coupling planes, which corresponds to a total length of 93.3 cm (!).

EXAMPLE 3 (high-index version)

Like the version of Example 2, this version is based on a standard heterostructure layer stack containing the material InP, for the substrate layer $S_1$ and for the strip-type elements $S_3$ and $S_4$, having a refractive index of 3.1755, and containing the material InCaAsP, for the light-guiding layer $S_2$, having a refractive index of 3.4028.

The version relates to $TE_{00}$-$TM_{00}$ converters in which the subsections P and Q both have right-angled trapeziums as a cross-section, which are mirror images of each other and have the following dimensions: h=0.5 µm, $d_1$=1.2 µm, $d_2$=0.8 µm, with $\Delta_1$=0, and $\Delta_2$=0.4 µm for the one subsection, and with $\Delta_1$=0, and $\Delta_2$=0.4 µm for the other subsection. In this arrangement, the two subsections are situated in line in such a way that there is a common plane perpendicular to the plane of the substrate, which divides each of the subsections into sections of equal volume (or, which is the same, which divides the cross-sections of the successive sections into sections of equal area).

FEM results:
$TE_{00}$ ↔ $TM_{01}$ converter (100% conversion)

| | |
|---|---|
| Attenuation/coupling plane | 0.175 dB |
| Coupling factor/coupling plane | 0.079 rad |
| Number of coupling planes | 20 |
| Total length | 1200 µm |
| Total attenuation | 3.5 dB |

These are results in which the oblique side walls of the strip-type elements of the subsections P and Q form an angle of 45° with the top plane of the substrate S. By means of this angle being varied, while the sum of the widths $d_1$ and $d_2$ is kept constant, the total attenuation and the number of coupling planes can be reduced at each other's expense. Thus, a total attenuation of 1 dB was found to be achievable at an angle of 77° and 70 coupling planes, which corresponds to a total length of 4200 µm. If, for both the subsections P and Q, strip-type elements are chosen which have an identical rectangular cross-section with h=0.5 µm and $d_1$=$d_2$=1.0 µm, and which are joined to one another, alternately to the one side and the other side, with a lateral offset the offset in each case being 0.2 µm, the following results were found.

FEM results:
$TE_{00}$ ↔ $TM_{01}$ converter (100% conversion)

| | |
|---|---|
| Attenuation/coupling plane | 0.26 dB |
| Coupling factor/coupling plane | 0.0082 rad |
| Number of coupling planes | 192 |
| Total length | 11,150 µm |
| Total attenuation | 50.0 dB |

By means of the offset with which the strip-type elements are joined to each other being varied, while the width $d_1$=$d_2$=1.0 µm was kept constant, a total attenuation of 1 dB was found to be achievable at an offset of 0.004 µm and 9600 coupling planes, which correspond to a total length of 55.76 cm (!).

The examples described illustrate that it is possible, by using a strip-type structure having alternately oblique and vertical side walls, to implement polarization converters which, for a given permitted attenuation, are several hundred times shorter than those which are based on a strip-type structure having alternately wide and narrow or laterally offset part strips having exclusively vertical side walls and suitably chosen widths; this applies, moreover, to layer stacks and waveguide dimensions which have not been specifically optimized for implementing such converters.

The above shows that a polarization converter having a markedly enhanced conversion efficiency can be implemented by defining the intermediary waveguide by an elongated strip-type structure having a periodic alternation, in the longitudinal direction, of vertical and oblique side walls or sides, possibly further combined with narrowing and widening and/or offsetting with respect to a central axis of the strip-type structure. The implementation of such a structure is now illustrated with reference to an example based on indium phosphide. Two different etching processes are required, viz. a wet-chemical process for etching the oblique sides according to a chosen crystal orientation, and a dry-etching process, in particular an RIE process (Reactive Ion Etching) for etching the vertical sides; two different masks are required for this purpose.

In the case of wafers of crystalline substrate material such as indium phosphide, it is standard practice to use the plane (001) as the top plane of the substrate on which or in which channel-type waveguides are implemented, for example by etching ridge-type patterns. The most common direction of such a ridge-type pattern is the (−110) direction. In accordance with this direction, the ridge-type patterns can be provided with oblique sides in accordance with the Crystal plane (111) by etching with halogen-based, wet-chemical etchants. For this purpose, an etching regime must be chosen which is kinetic, that is to say that the diffusion of the etched material in the etching fluid proceeds more rapidly than the production of the etched material. In that case, the crystal plane (111) is found to etch much more slowly than other planes, as a result of which the oblique sides are formed, specifically in accordance with an angle of 54.44 degrees with the top plane. This angle corresponds very well with the optimum angle of 53 degrees, specified above as a result of the FEM calculation, for the $TM_{00}$-$TE_{01}$ converters based on InP.

An implementation of two channel-type waveguides which are defined by a strip-type structure on or in an indium phosphide substrate according to the crystal orientation mentioned and which alternately have vertical and oblique side walls, is now illustrated with reference to the figures FIG. 4 to 13 inclusive. The figures FIG. 4 to FIG. 9 inclusive relate to a waveguide based on a strip-type structure having subsections which alternately have a rectangle and an isosceles trapezium as their cross-section.

The figures FIG. 10 to FIG. 13 inclusive show such a waveguide based on a strip-type structure having subsections which alternately have right-angled trapeziums which are mirror images of one another as their cross-section.

Figure 4:
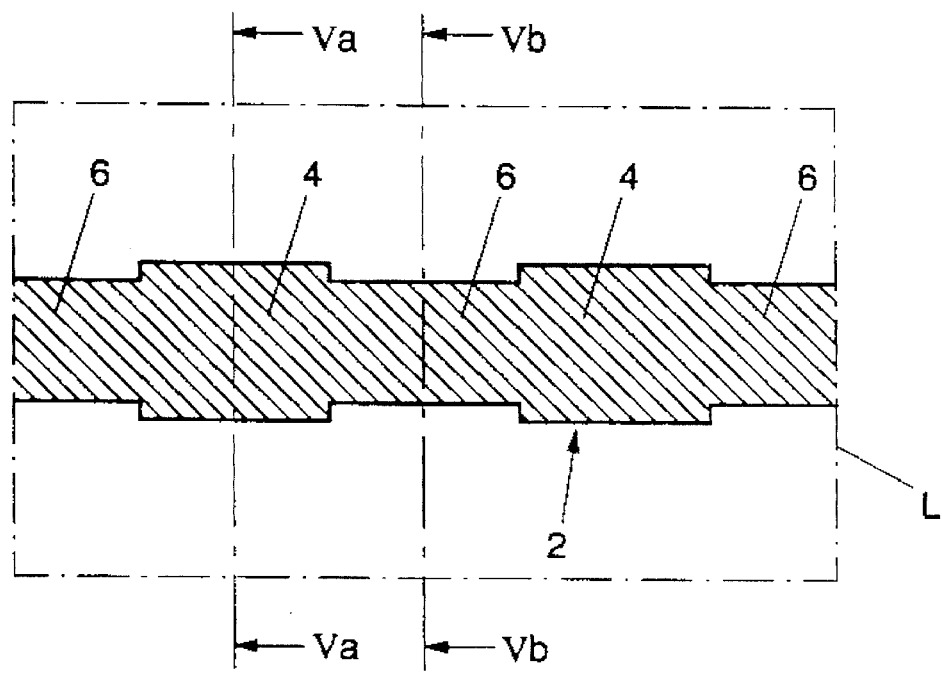
FIG. 4: shows a top view of a part of a wafer having a layered structure, on which a waveguide is implemented, formed by an alternate concatenation of two different strip-type elements having a rectangular and a trapeziform cross-section, respectively, according to the method of the invention, in a first processing stage.
Figure 5A:
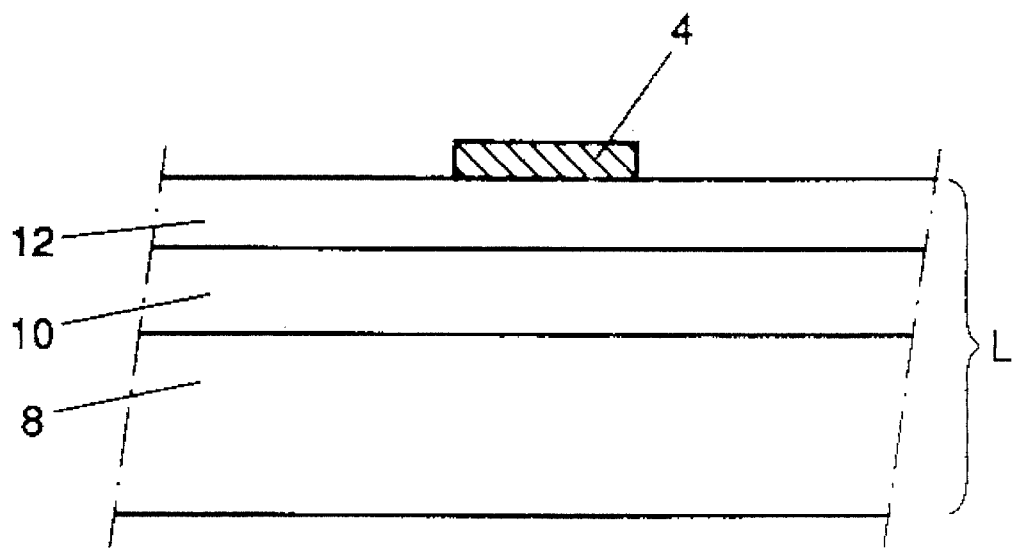
FIG. 5a: a transverse section of a part of the wafer being processed, along the line $V_a$—$V_a$ in FIG. 4.
Figure 5B:
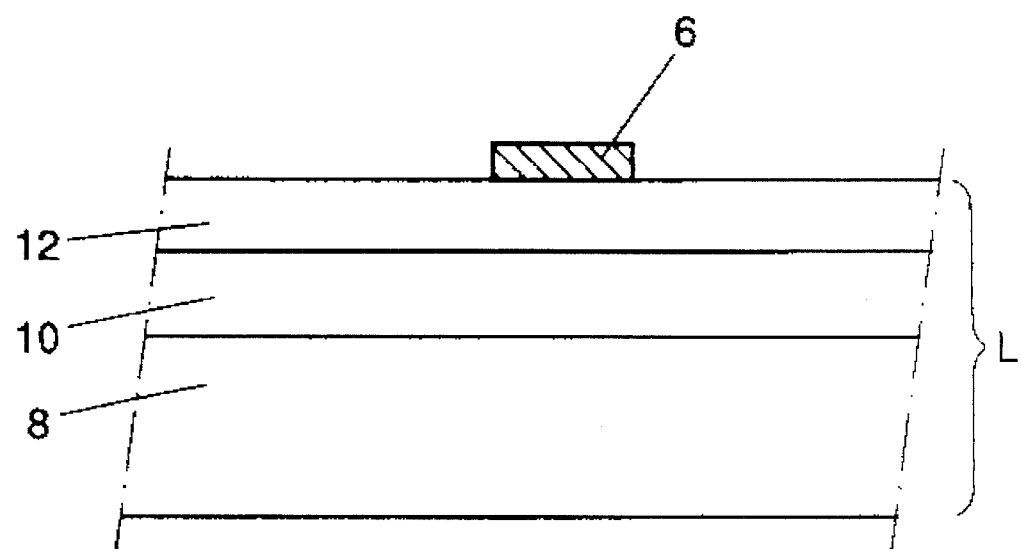
FIG. 5b: a transverse section of a part of the wafer being processed, along the line $V_b$—$V_b$ in FIG. 4.
Figure 6:
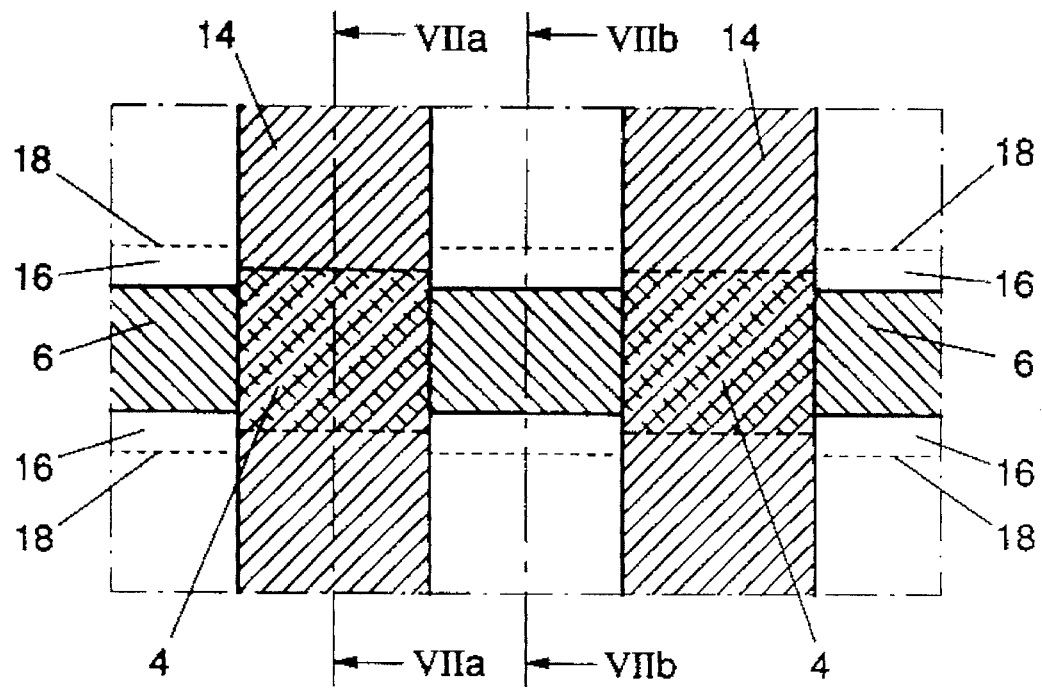
FIG. 6: shows, in a manner corresponding to FIG. 4, a top view of a part of the wafer in a second processing stage.
Figure 7A:
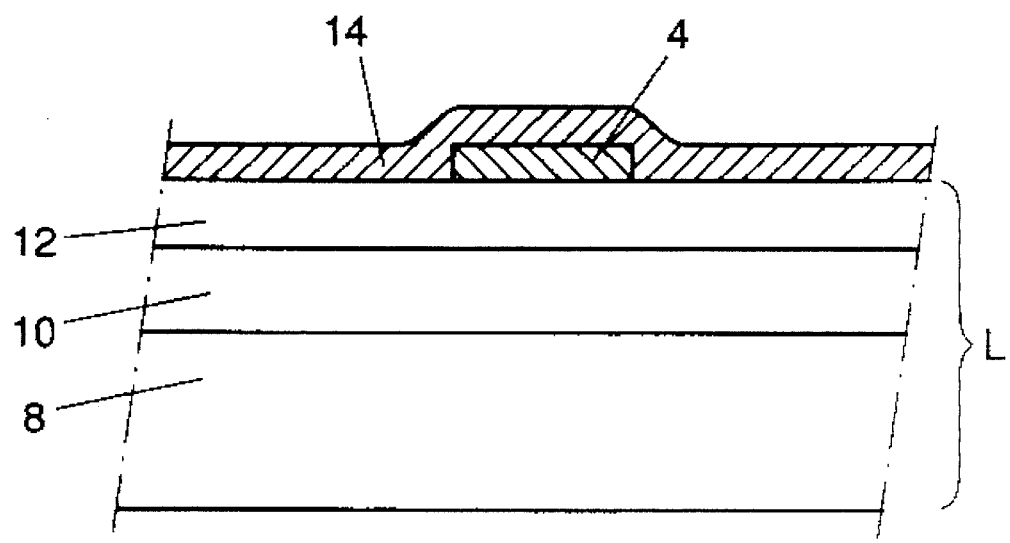
FIG. 7a: a transverse section of a part of the wafer being processed, along the line $VII_a$—$VII_a$ in FIG. 6.

FIG. 4 depicts, in a top view, a section of a crystalline wafer L to which, according to known technology, there has been applied, in a first step, a first mask pattern 2 (hatching pointing to the left). The mask pattern 2 is an elongated strip of quartz ($SiO_2$) having alternately wide and narrow part strips 4 and 6, respectively. The elongated strip is oriented in accordance with the desired (−110) direction of the waveguide to be implemented. The part strips 4 and 6 have precisely defined dimensions, tailored to the eventual use of the waveguide to be implemented. FIG. 5a shows a transverse section of a wide part Strip 4, along the line $V_1$—$V_8$ in FIG. 4, while FIG. 5 shows a transverse section of a narrow part strip 6, along the line $V_b$—$V_b$ in FIG. 4. The wafer L has a layered structure. To a substrate layer 8, formed by a wafer of crystalline InP, there are applied, according to known techniques, two epitaxial layers, viz. a light-guiding layer 10 of InGaAsP and a top layer 12 of InP. There is then applied, to the wafer L over the first mask pattern 2, a second mask pattern of photoresist. This situation is depicted in FIG. 6. The second mask pattern consists of a number of straight strips 14 (hatching directed to the right), which lie transversely across the elongated strip of the first mask pattern 2 and precisely cover the wide strips 4 thereof, while the narrow strips are not covered. FIG. 7a shows, at the position of a wide part strip 4, the transverse section along the line $VII_a$—$VII_a$ in FIG. 6, while the transverse section at the position of a narrow part strip 6 has remained identical to that depicted in FIG. 5b along the line $V_b$—$V_b$ in FIG. 4. The strips 14 have to extend sufficiently far on both sides of the elongated strip of the first mask pattern 2.

It should be noted that the straight strips 14 can be produced with a mask whose alignment with respect to the first mask pattern 2 is not critical. The fact is, that for the purpose of application in a passive polarization converter, the lengths ($L_P$ and $L_Q$) of the subsections (P and Q) have to be defined within a few microns, which requires an accuracy of alignment which is easily achievable under the prior art.

Figure 7B:
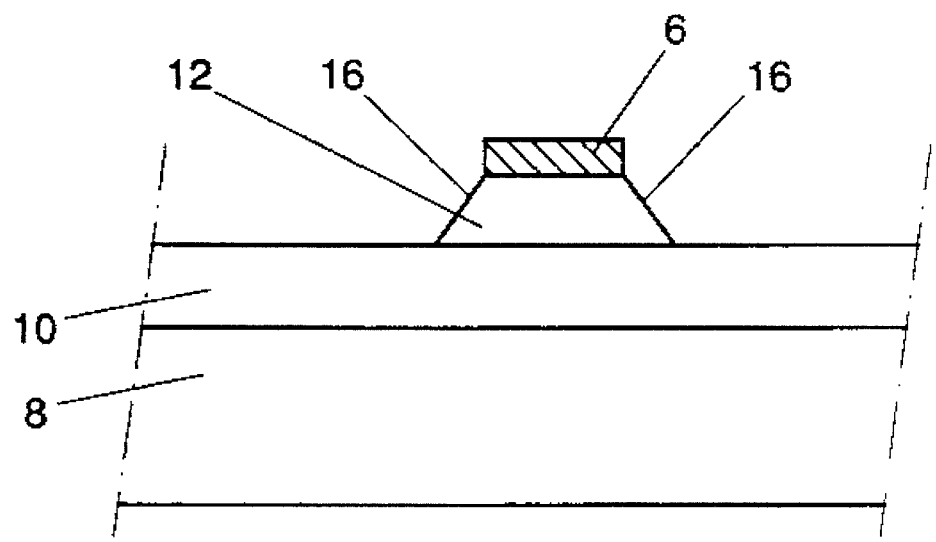
FIG. 7b: a transverse section of a part of the wafer being processed, along the line $VII_b$—$VII_b$ in FIG. 6.

A first etching step is then carried out using a wet-chemical medium on the basis of halogens, according to a "kinetic" etching regime as indicated above. This involves the top layer 12 of InP, where this is not covered with quartz material and/or photoresist material of the first mask pattern 2 and of the strips 14 of the second mask pattern, being etched away up to the light-guiding InGaAsP layer 10. In the process, the remaining sections of the top layer 12 underneath the narrow part strips 6 are provided, owing to the crystal orientation chosen, with oblique side walls 16. In FIG. 6, dotted lines 18 represent the outermost edges of the side walls 16 on both sides of the narrow part strips 6, while FIG. 7b shows a transverse section at the position of a narrow part strip 6 along the line $VII_b$—$VII_b$ in FIG. 6.

Figure 8:
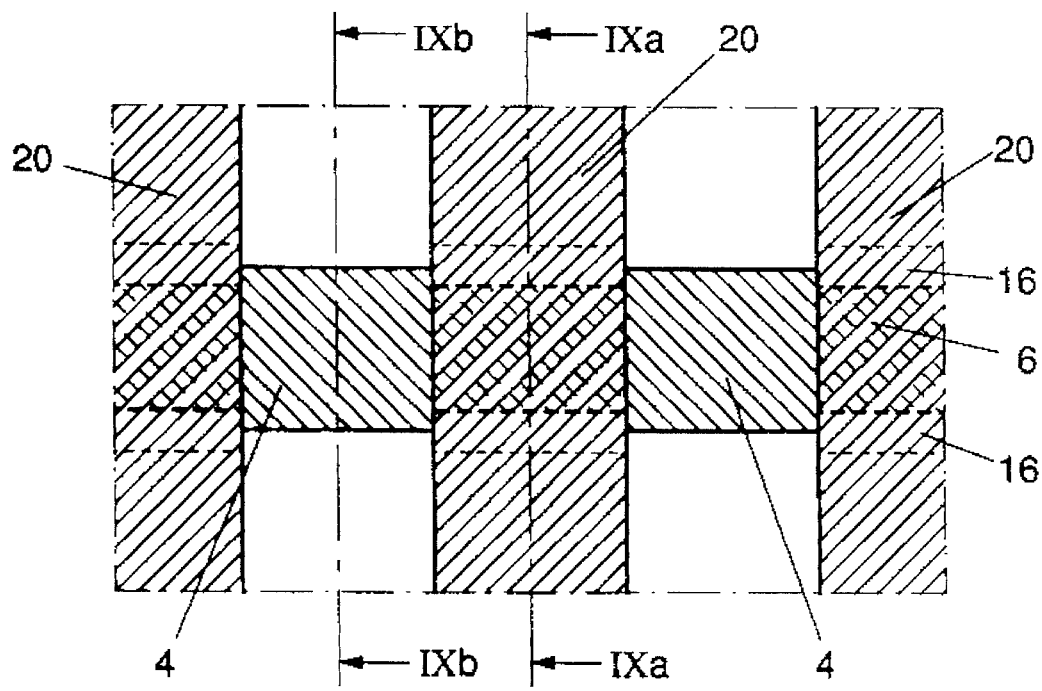
FIG. 8: shows, in a manner corresponding to FIG. 4, a top view of a part of the wafer in a third processing stage.
Figure 9A:
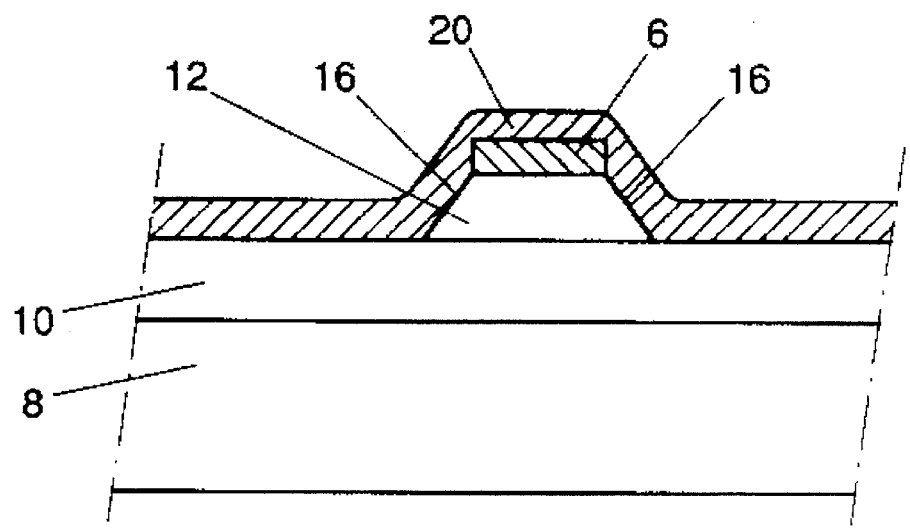
FIG. 9a: a transverse section of a part of the wafer being processed, along the line $IX_a$—$IX_a$ in FIG. 8.

As the next step, a second quartz layer is applied over the whole, i.e. over the etched sections and over the sections of the part strips 6 and the strips 14 of the first and the second mask pattern, respectively, which are visible in the top view. Then a step is performed which is known as "lift-off technique" (see for example reference [8a]) and more specifically using acetone (see for example reference [8b]). In accordance with this step, the photoresist sections, viz. the strips 14, are removed, with the aid of acetone, from the second mask pattern, including the sections of the second quartz layer present on the photoresist, as a result of which a third mask pattern of quartz remains behind, which is formed by strips 20 and which forms the complement of the second mask pattern of photoresist. FIG. 8 shows a top view of a section of the wafer after the "lift-off" step. FIG. 9a shows, at the position of a narrow part strip 6 of the mask pattern 2, the transverse section along the line $IX_a$—$IX_a$ in FIG. 8, while the transverse section at the position of a wide part strip 4 again has become identical to that depicted in FIG. 5a along the line $V_a$—$V_a$ in FIG. 4.

Figure 9B:
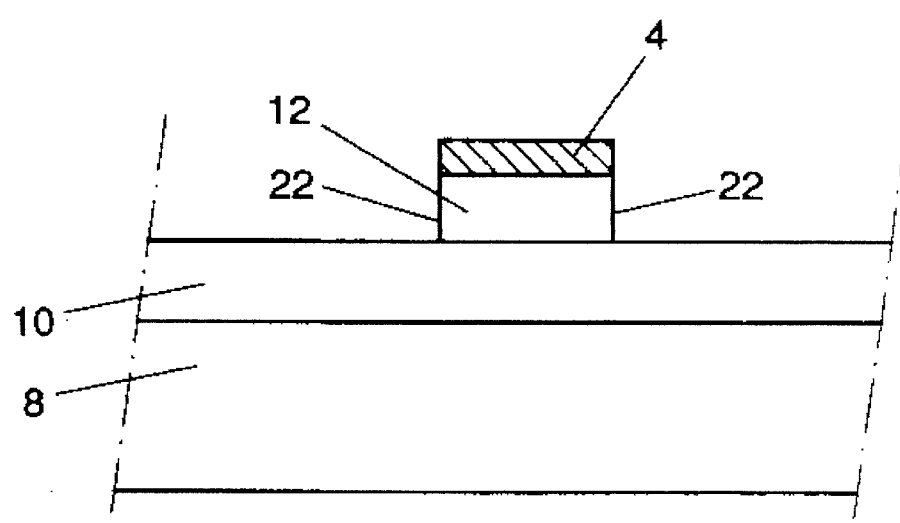
FIG. 9b: a transverse section of a part of the wafer being processed, along the line $IX_b$—$IX_b$ in FIG. 8.

Then a second etching step is performed, now using dry-chemical etchants in accordance with a "reactive ion etching (RIE)" process, for etching away the still remaining and not covered sections of the original top layer 12 of InP up to the light-guiding InGaAsP layer 10. In the process the remaining sections of the top layer 12 underneath the wide part strips 4 of the first mask pattern 2 are provided with vertical side walls 22. FIG. 9b shows a transverse section at the position of a narrow part strip 6 along the line $IX_b$—$IX_b$ in FIG. 8 after the second etching step. As the last step, a cleaning step is performed in which the remaining quartz sections, viz. the half-strips 26 and 28, and the strips 20, of the first and the third mask pattern, respectively, are removed.

The first etching step of wet-chemical etching of indium phosphide can suitably be carried out with agents which are based on halogens such as bromomethanol, HCl, HBr, $Br_2$ and mutual mixtures thereof.

The second etching step, that of dry-etching of indium phosphide, can be performed in an RIE process using a $CH_4/H_2$ gas mixture as known from reference [9].

The quartz residues of the first and the second mask pattern are readily removed by means of an HF solution or a $CHF_3$ etching process. Such a $CHF_3$ etching process can also be used when implementing the first mask pattern 2 in quartz.

When the "lift-off" technique is used with photoresist, as a result of which critical mutual alignment of the mask patterns can be dispensed with, the steps of wet-chemical etching and of dry-etching in an RIE process must not be interchanged. The dry-etching process affects the photoresist in such a way that it becomes sparingly soluble, as a result of which the "lift-off" process is no longer possible.

It is possible to use as the first mask pattern 2, instead of an elongated strip having wide and narrow part strips, alternatively an elongated strip which is of equal width throughout. The application of the second mask pattern then no longer requires aligning with respect to the first mask pattern. This does, however, result in one degree of freedom fewer for suitable dimensioning of the waveguide profiles of the two successive wave-guiding sections P and Q in a polarization converter.

Figure 10:
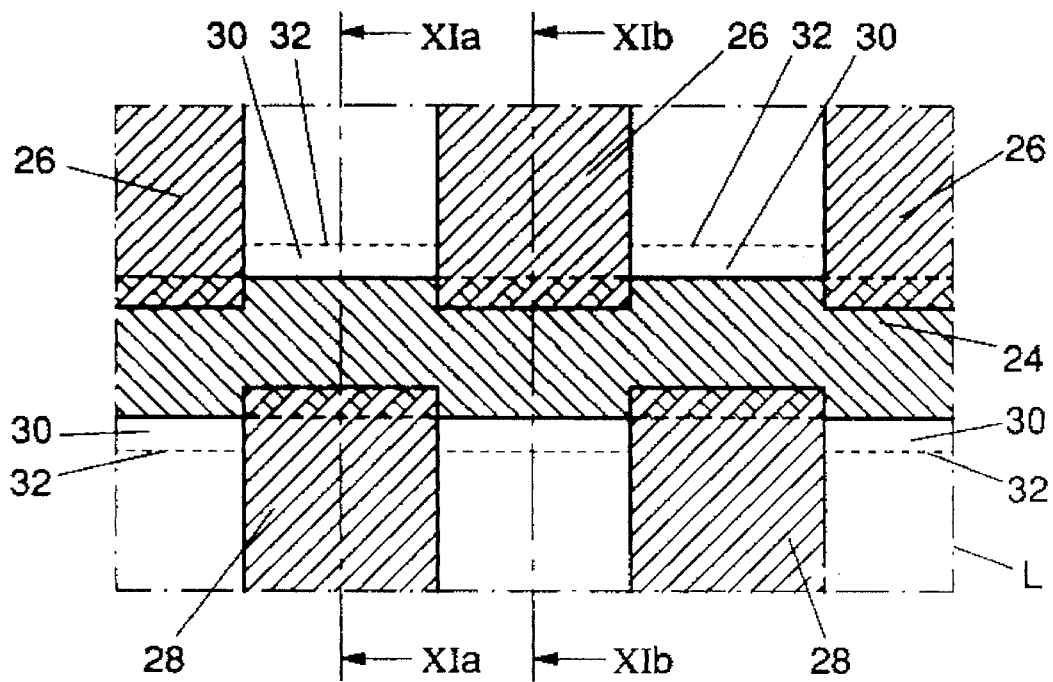
FIG. 10: shows a top view of a part of a wafer having a layered structure, on which a waveguide is implemented, formed by an alternate concatenation of two different strip-type elements, both having right-angled trapeziform cross-sections according to the method of the invention, which are mirror images of one another, in a first processing stage.
Figure 11A:
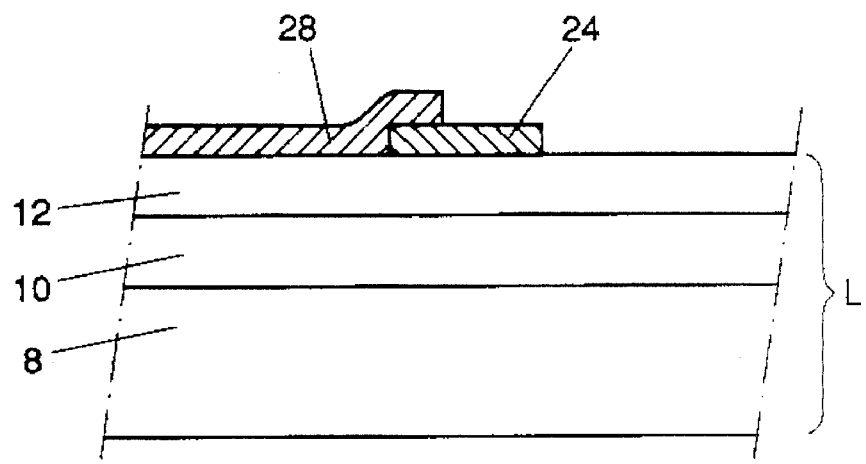
FIG. 11a: a transverse section of a part of the wafer being processed, along the line $XI_a$—$XI_a$ in FIG. 10 immediately prior to a first etching step of wet chemical etching.
Figure 11B:
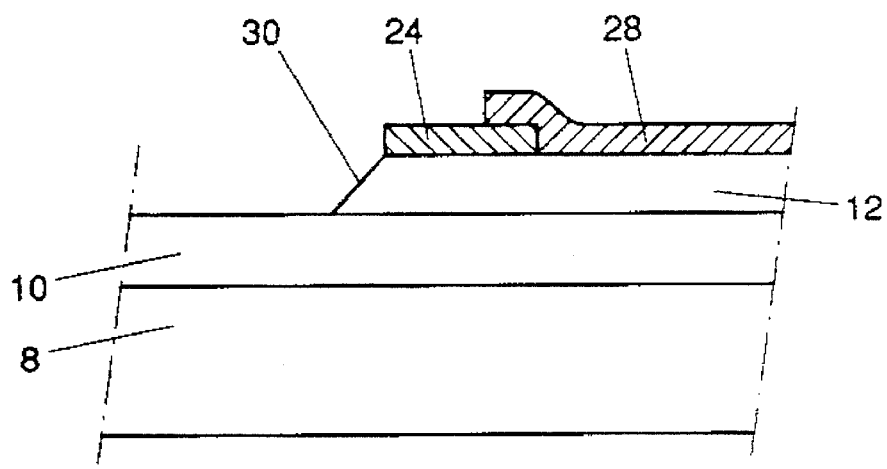
FIG. 11b: a transverse section of a part of the wafer being processed, alone, the line $XI_b$—$XI_b$ in FIG. 10 immediately following the first etching step of wet-chemical etching.

FIG. 10 shows, in a top view, a section of a wafer L to which, according to known technology, a first mask pattern of quartz (hatching directed to the left) has been applied in a first step, and a second mask pattern of photoresist (hatching directed to the right) has been applied in a second step. The first mask pattern is an elongated strip 24 of quartz ($SiO_2$) which is of constant width throughout. The elongated strip is oriented in accordance with the desired (−110) direction of the waveguide to be implemented. The wafer L has the same layered structure as described above with respect to FIG. 4. The second mask pattern consists of a number of straight half-strips 26 and 28 which are partially situated on the elongated strip 24 and extend in a direction transverse to elongated strip 24, the half-strips 26 on the one side, and the half-strips 28 on the opposite side of strip 24. In this arrangement, each pair of successive half-strips 26 or 28 leaves uncovered, on the same side of the strip 24, a strip of the indium phosphide top layer 12, in each case of the same width as the half-strip 28 or 26 situated opposite thereto on the other side of the strip 24. The part strokes 26 and 28 have accurately defined dimensions, tailored to the eventual use of the waveguide to be implemented. FIG. 11a shows a transverse section along the line $XI_a$—$XI_a$ in FIG. 10 through a half-strip 28. Such a transverse section through the one half-strip 26, seen in the same direction, produces an identical, but mirrored image. Then the first etching step is performed using a wet-chemical medium. This involves the top layer 12 of InP, where it is not covered with quartz material and/or photoresist material of the first and the second mask pattern, being etched away up to the light-guiding InGaAsP layer 10. The remaining sections of the top layer 12 underneath the elongated strip 24 between the half-strips 26 and 28 are provided, in accordance with the crystal orientation, with oblique side walls 30. In FIG. 10, dotted lines 32 indicate the outermost edges of the side walls 30, alternately on the one and the other side of the elongated strip 24, while FIG. 11b shows a transverse section along the line $XI_b$—$XI_b$ in FIG. 10 through a half-strip 26. Such a transverse section through a half-strip 28 is the mirror image of the transverse section depicted in FIG. 11b.

Figure 12:
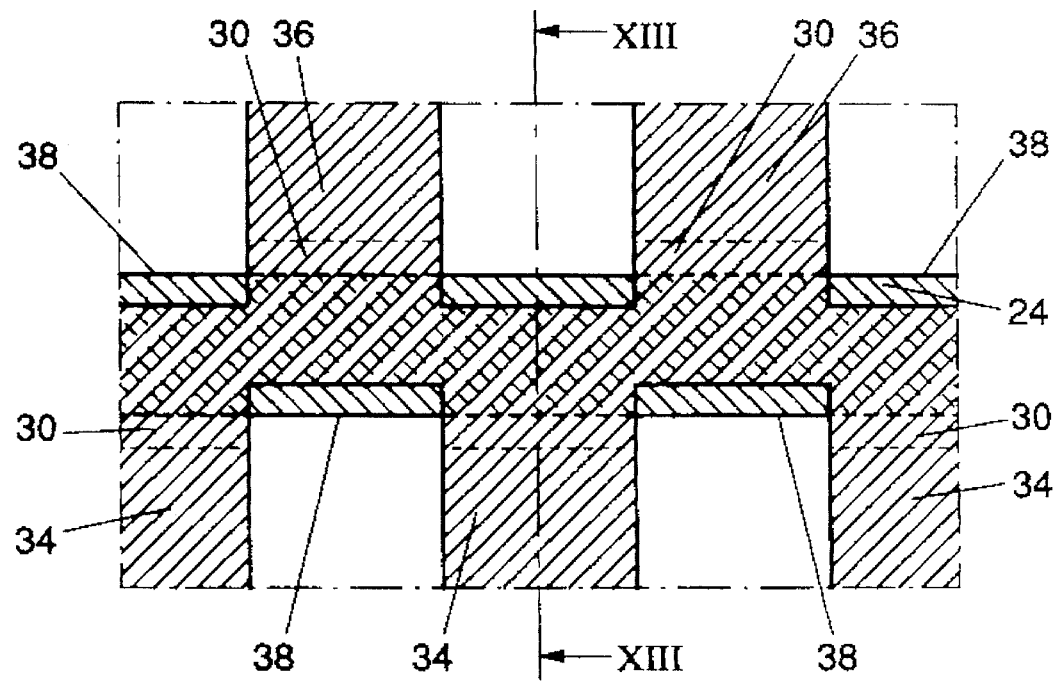
FIG. 12: shows, in a manner corresponding to FIG. 10, a top view of a part of the wafer in a second processing stage.

Subsequently the whole is again covered on the top side with a quartz layer, and by means of a "lift-off" process all the photoresist sections are again removed from the second mask pattern, viz. the half-strips 26 and 28, including the quartz sections, situated thereabove, of the quartz layer. Then a third mask pattern remains, which is formed by half-strips 34 and 36 and which is complementary to the second mask pattern of photoresist. FIG. 12 shows a top view of the wafer after the "lift-off" step.

Figure 13:
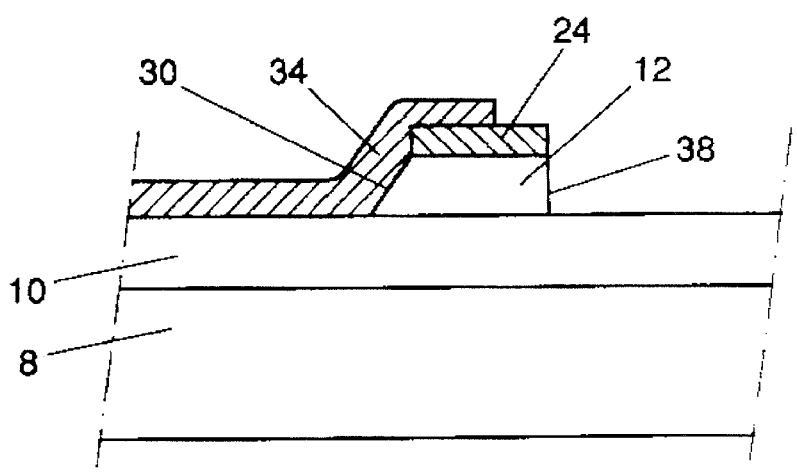
FIG. 13: a transverse section of a part of the wafer being processed, along the line XIII—XIII in FIG. 12.

Then the second etching step of dry-etching in an RIE process is performed. This involves the uncovered sections of the top layer 12 of InP being etched away up to the light-guiding InCaAsP layer 10. In the process, the remaining sections of the top layer 12 underneath the elongated strip 24 between the half-strips 34 and between the half-strips 36 are provided with vertical side walls 38. FIG. 13 shows a transverse section along the line XIII—XIII in FIG. 12 through a half-strip 34 after the second etching step. Such a transverse section through a half-strip 36 produces the mirrored image of FIG. 13. A cleaning step is again performed as the last step, in which the remaining quartz sections, viz. the strip 24 and the half-strips 34 and 36 of the first and the third mask pattern, respectively, are removed.

It is equally possible to use, as the first mask pattern, instead of an elongated strip having constant width over its entire length, an elongated strip having alternately wide and narrow part strips or, alternatively, a strip having identical part strips which are joined to one another in an offset manner. In these cases, a similar alignment of the second mask pattern with respect to the first mask pattern is necessary, as indicated in the embodiment described with reference to FIG. 4 to FIG. 9 inclusive.

I claim:

1. Polarization converter for the conversion of a fraction of a signal component, propagating according to a first guided mode, of an optical signal into a signal component propagating according to a second guided mode, the first and second guided modes relating to different polarization modes, comprising a channel-type waveguide supported by a substrate, in which waveguide a periodic coupling takes place between the two guided modes of the optical signal propagating in the waveguide, said waveguide comprising:

an incoming wave-guiding section;

an intermediary wave-guiding section; and an outgoing wave-guiding section;

the intermediary wave-guiding section having a periodic geometrical structure including a periodic concatenation of, within a period length, two wave-guiding subsections, the lengths of the wave-guiding subsections and the number of periods of the periodic concatenation being tailored to a desired conversion fraction; and wherein the two wave-guiding subsections each comprise different strip-type elements respectively provided with side walls which are at mutually different angles with respect to the plane of the substrate, said different strip-type elements defining different waveguide profiles for the two wave-guiding subsections, respectively.

2. Polarization converter according to claim 1, wherein the strip-type elements of the two wave-guide subsections, seen transversely to longitudinal directions thereof, have mutually different trapeziform cross-sections.

3. Polarization converter according to claim 2, wherein the cross-sections of the strip-type elements of a first and a second of the two wave-guide subsections are substantially a rectangle and substantially an isosceles trapezium, respectively.

4. Polarization converter according to claim 2, wherein the cross-sections of the strip-type elements of the two wave-guide subsections are substantially right-angled trapeziums, the two trapeziums having oblique sides which are situated on opposite sides of the intermediary wave-guiding section.

5. Polarization converter according to any one of claim 2, 3 or 4, wherein the cross-sections are of substantially equal height.

6. Method for fabricating a channel-type waveguide on a substrate made of crystalline material and provided with a light-guiding layer, which waveguide comprises a concatenation of wave-guiding sections having alternately a first and a second mutually different waveguide profile, the mutually different waveguide profiles being defined at least by strip-type elements having different trapeziform cross-sections, the method comprising the steps of:

(a) applying to the substrate a first strip-type mask pattern of a first mask material in a direction tailored to the crystal orientation of the light-guiding layer, (b) applying to the substrate, and partially over the first strip-type mask pattern, a second mask pattern of a second mask material, which second mask material comprises a number of parallel strip-type subpatterns which lie substantially transversely to, and at least partially over, the first strip-type mask pattern, (c) a first etching step, using first etchants, of parts of the substrate which are not covered by the first and second mask materials, (d) removing the second mask material, (e) covering the parts etched in the first etching step with a third mask material, (f) a, second etching step, using second etchants, of parts of the substrate which are: not covered by the first and third mask materials, (g) removing the first and third mask materials, one of the first and second etching steps being carried out with wet-chemical etchants and the other of said first and second etching steps being carried out with dry etchants.

7. Method according to claim 6, wherein:

step (c) is carried out using wet chemical etchants, and steps (d) and (e) are carried out using a "lift-off" technique which comprises the following substeps:

covering the first and second mask patterns and the etched sections of the substrate with a mask layer of a material identical to the first mask material, and removing, using a solvent, the second mask material, including those parts of the first mask material which are situated thereon.

8. Method according to claim 6 or 7, wherein:

the first strip-type mask pattern in a longitudinal direction thereof comprises alternately wide part strips and narrow part strips; and the strip-type subpatterns of the second mask pattern entirely cover only the wide part strips or only the narrow part strips of the first mask pattern.

9. Method according to claim 6 or 7, wherein:

the first strip-type mask pattern in a longitudinal direction thereof comprises alternately wide part strips and narrow part strips; and the strip-type subpatterns of the second mask pattern partially cover the first mask pattern on the same side of the wide part strips and on the other side opposite thereto of the narrow part strips.

10. Method according to claim 6 or 7, wherein the first strip-type mask pattern includes an elongated strip having a substantially constant width in the longitudinal direction of the elongated strip.

11. Method according to claim 6 or 7, the first strip-type mask pattern in a longitudinal direction thereof comprises part strips of substantially equal width, which part strips are joined to one another, with a lateral offset, alternately in one and in another direction; and the strip-type subpatterns of the second mask pattern partially cover the first mask pattern, offset in the one direction on the same side of the part strips, and offset in said another direction on the other, opposite side of the part strips.

12. Method according to claim 6 or 7, wherein the second mask material comprises a photosensitive material.

13. Channel-type waveguide on a substrate made of crystalline material and provided with a light-guiding layer, which waveguide comprises a concatenation of wave-guiding sections having alternately a first and a second mutually different waveguide profile, defined by strip-type elements having respective different trapeziform cross-sections, fabricated in accordance with a method according to claim 6 or 7.

* * * * *

UNITED STATES PATENT AND TRADEMARK OFFICE
CERTIFICATE OF CORRECTION

PATENT NO. : 5,539,845
DATED : July 23, 1996
INVENTOR(S) : Johannes J.G.M. VAN DER TOL It is certified that error appears in the above-indentified patent and that said Letters Patent is hereby corrected as shown below:

Column 1, line 23, replace "output" with --outgoing--.

Column 4, line 12, replace "1.2 [m" with --1.2 $\mu$m--.

Column 11, last line, replace "$V_1$-$V_8$" with --$V_a$-$V_a$--.

Signed and Sealed this

Twelfth Day of August, 1997

Attest:

BRUCE LEHMAN

Attesting Officer

Commissioner of Patents and Trademarks